(12) United States Patent
Ben-Benjamin

(10) Patent No.: US 10,757,078 B2
(45) Date of Patent: Aug. 25, 2020

(54) SYSTEMS AND METHODS FOR PROVIDING MULTI-LEVEL NETWORK SECURITY

(71) Applicant: Moshe Ben-Benjamin, Atlantic Beach, NY (US)

(72) Inventor: Moshe Ben-Benjamin, Atlantic Beach, NY (US)

( * ) Notice: Subject to any disclaimer, the term of this patent is extended or adjusted under 35 U.S.C. 154(b) by 165 days.

(21) Appl. No.: 15/747,315

(22) PCT Filed: Jul. 22, 2016

(86) PCT No.: PCT/US2016/043708
§ 371 (c)(1),
(2) Date: Jan. 24, 2018

(87) PCT Pub. No.: WO2017/019551
PCT Pub. Date: Feb. 2, 2017

(65) Prior Publication Data
US 2018/0219834 A1    Aug. 2, 2018

Related U.S. Application Data

(60) Provisional application No. 62/196,957, filed on Jul. 25, 2015.

(51) Int. Cl.
*H04L 29/06* (2006.01)
(52) U.S. Cl.
CPC .......... *H04L 63/0263* (2013.01); *H04L 63/20* (2013.01); *H04L 63/0428* (2013.01)

(58) Field of Classification Search
None
See application file for complete search history.

(56) References Cited

U.S. PATENT DOCUMENTS

| 5,832,228 | A  | * | 11/1998 | Holden   | G06F 21/606  |
|           |    |   |         |          | 709/225      |
| 7,046,691 | B1 | * | 5/2006  | Kadyk    | H04L 12/66   |
|           |    |   |         |          | 370/466      |
| 7,272,662 | B2 | * | 9/2007  | Chesnais | H04L 29/06   |
|           |    |   |         |          | 709/230      |
| 8,352,998 | B1 | * | 1/2013  | Kougiouris | H04L 63/10 |
|           |    |   |         |          | 726/1        |
| 2002/0112181 | A1 |  | 8/2002 | Smith    |              |
| 2012/0084507 | A1 |  | 4/2012 | Colgrove et al. |       |

* cited by examiner

*Primary Examiner* — Brandon S Hoffman

(57) ABSTRACT

Systems and methods for providing network security include receiving, by a first server of a first network, data having a destination of a second network; determining, by the first server, a first set of actions to be taken based at least in part on the data, including transmitting the data to applications on the first server; converting, by the first server, the data into a first data structure; adding, by the first server, the data into a queue shared with a second server of the first computer network; reading, by the second server, the data in the form of the first data structure from the queue; determining, by the second server, a second set of actions to be performed based at least in part on the read data; converting, by the second server, the read data into a second data structure; and transmitting the converted data to the destination.

30 Claims, 5 Drawing Sheets

SYSTEMS AND METHODS FOR PROVIDING MULTI-LEVEL NETWORK SECURITY

CROSS REFERENCE TO RELATED APPLICATIONS

This patent application is a national phase entry, and a continuation-in-part, of International Application No. PCT/US2016/043708, filed Jul. 22, 2016, which itself claims the benefit of and priority to U.S. Provisional Patent Application No. 62/196,957, filed Jul. 25, 2015, each of whose entire contents are incorporated herein by reference in their respective entireties.

FIELD OF THE INVENTION

The present invention relates to the field of cyber-security. In particular, the present invention is directed to systems and methods for providing multi-level network security.

BACKGROUND OF THE INVENTION

Every device is vulnerable to security breaches, which can be perpetrated by actors, e.g., either from among members of its internal network, from its external network (internet), and/or by actors with direct physical access to the device. Over the past few years, there has been an increase in frequency and ingenuity of attacks on digital devices, which demonstrate that existing measures can be insufficient in their protective capabilities.

Security breaches can concern substantially every entity in the modern world, including governments, financial institutions, large corporations, small businesses, and/or private people. Such breaches can include data theft, data corruption, theft of intellectual property, physical sabotage, identity theft, blackmail, propaganda, public shaming, etc. Over the past few years, attacks on digital devices in particular have become more increased and varied, further indicating that existing measures can be insufficient in their protective capabilities. These attacks can be perpetrated by actors from military groups, government funded groups, crime syndicates, private people, etc., and can be motivated by political reasons, financial reasons, religious reasons, personal reasons, etc. These attacks can originate from anywhere in the world, and they can happen quickly; e.g., more quickly than a typical human can reasonably respond.

Today, devices are typically protected by a combination of firewall, anti-spyware, and anti-virus software, which have been shown to be largely ineffective against continually evolving modern threats and actors. For example, current security software solutions can often require constant rules, and are infrequently maintained, which can cause irrelevant security checks due to changing threats. These tools can also be limited in their response to threats, as they can only affect the incoming and outgoing network packets, without having the ability to implement any intermediary layers of protection.

Other current security protocols attempt to protect devices by restricting users to use under-privileged computer accounts, which are often inconvenient and can stifle productivity. Some current security software solutions try educating those who use the devices and attempt to restrict their behavior. This method of defense can depend on unreliable and often unpredictable or inconsistent factors, for example, some users are inept and/or irrational, some do not understand how to follow instructions, and some forget and/or refuse to change their behavior when interacting with their devices. Another method of protection is blacklisting the use of certain protocols. This method typically does not protect from unknown protocols, viruses, malware, and/or harmful software such as those which are embedded in hardware and/or in operating systems. Some current security solutions can employ deep packet scanning and/or statistics to discriminate between packets, which is inefficient and time consuming.

It can be desirable, therefore, to provide security systems and methods that help protect devices and systems from attacks, e.g., in the form of viruses, malware, spyware, backdoors, and/or hacking. It can further be desirable to provide systems and methods that can prevent (or substantially prevent) a malevolent insider from mounting a successful espionage and/or sabotage campaign and/or from downloading and/or exporting data. It can further be desirable to provide systems and methods that can thwart attempts to collect network communications via sniffing, and can also help prevent a benevolent actor, who is legitimately connected to a network and/or using a device on which such systems and methods are implemented, from revealing information to unauthorized parties due to social engineering and/or negligence.

SUMMARY OF THE INVENTION

Embodiments of the invention include systems and methods for providing security to a first computer network in communication with a second computer network. In some embodiments, the method can include receiving, by a first server of the first computer network, data having a destination of the second computer network, the data in a first format that is a) specific to the second computer network, b) specific to the first computer network, c) specific to another computing network, d) encrypted, or e) any combination thereof; determining, by the first server, a first set of one or more actions to be taken based at least in part on the data, in which the first set of one or more actions can include transmitting the data to one or more applications on the first server; converting, by the first server of the first computer network, the data having the destination network into a first data structure; adding, by the first server of the first computer network, the data in the first data structure into a queue, the queue shared with a second server of the first computer network; reading, by the second server of the first computer network, the data in the form of the first data structure from the queue; determining, by the second server of the first computer network, a second set of one or more actions to be performed based at least in part on the read data; converting, by the second server of the first computer network, the read data into a second data structure, in which the second data structure is a data structure compatible with the destination for all or a portion of the read data; and transmitting, by the second server of the first computer network, the converted data to the destination.

In some embodiments, the first data structure can be based on a set of security rules. In some embodiments, the first set of one or more actions is based on a set of security rules. In some embodiments, at least one of the first set of one or more actions and the second set of one or more actions can include transmitting, rejecting, denying, dropping, modifying, forwarding, rerouting, logging, passing to an application, or any combination thereof. In some embodiments, at least one of the first determining step and the second determining step can be made based on the content of the data. In some embodiments, the set of one or more security rules can be at least one of predefined, dynamic, and configurable by an administrator. In some embodiments, if the request is from the second computer network and is toward a member of the first computer network, then the data can be transmitted via a format that is specialized for the first computer network. In some embodiments, at least one of the first data structure and the second data structure can be based on at least one of a type of the data, the destination of the data, a format of the data, a length of the data, content of the data, a checksum of the data, a source port of the data, a destination port of the data, whether the data was prompted, time of the data transmission/receipt, year of the data transmission/receipt, whether or not an app is associated with the data, which apps are or are not associated with the data, the structure of the network.

In some embodiments, determining the first set of one or more actions to be performed can further include passing the received data to one or more applications on the first server. In some embodiments, determining the second set of one or more actions to be performed further can include passing the read data to one or more applications on the second server. In some embodiments, transmitting can be implemented via a protocol, the protocol comprising appending information regarding the device and software that transmitted the data. In some embodiments, the data can be received by a software client resident on the first server. In some embodiments, the converting by the first server can include encrypting the data, adding addition data to the receive data, or any combination thereof. In some embodiments, the converting by the second server can include decrypting the read data, removing a portion of the read data used by the first server of the first computer network, or any combination thereof.

Further embodiments of the invention include systems and methods for providing security to a first computer network in communication with a second computer network. In some embodiments, the method can include receiving, by a first computer device of the first computer network, a request for data; determining, by the first computer device of the first computer network, whether the request for data is from a second computer network or from within the first computer network; determining, by the first computer device of the first computer network, one or more actions to take based on one or more security rules, the data itself, or any combination thereof; and performing, by the first computer device, one or more actions, in which if the request for data is from the second computer network, then determining, by the client of the first computer network, whether the request for data is a legitimate request based on the one or more security rules; if the request for data is a legitimate request, then transmitting, by the client of the first computer network, the request for data via a protocol that is specific to the first computer network to a server of the first computer network; and if the request for data is not legitimate, denying the request. In some embodiments, if the request for data is from an entity within the first computer network and requires data be sent to the second computer network, then transmitting, by the first computer device, the data to the second computer network via an internet protocol.

In accordance with further embodiments of the invention, systems can be provided which can implement the methods described herein according to embodiments of the invention.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example, and not limitation, in the figures of the accompanying drawings, in which like reference numerals indicate corresponding, analogous or similar elements, and in which:

Figure 1:
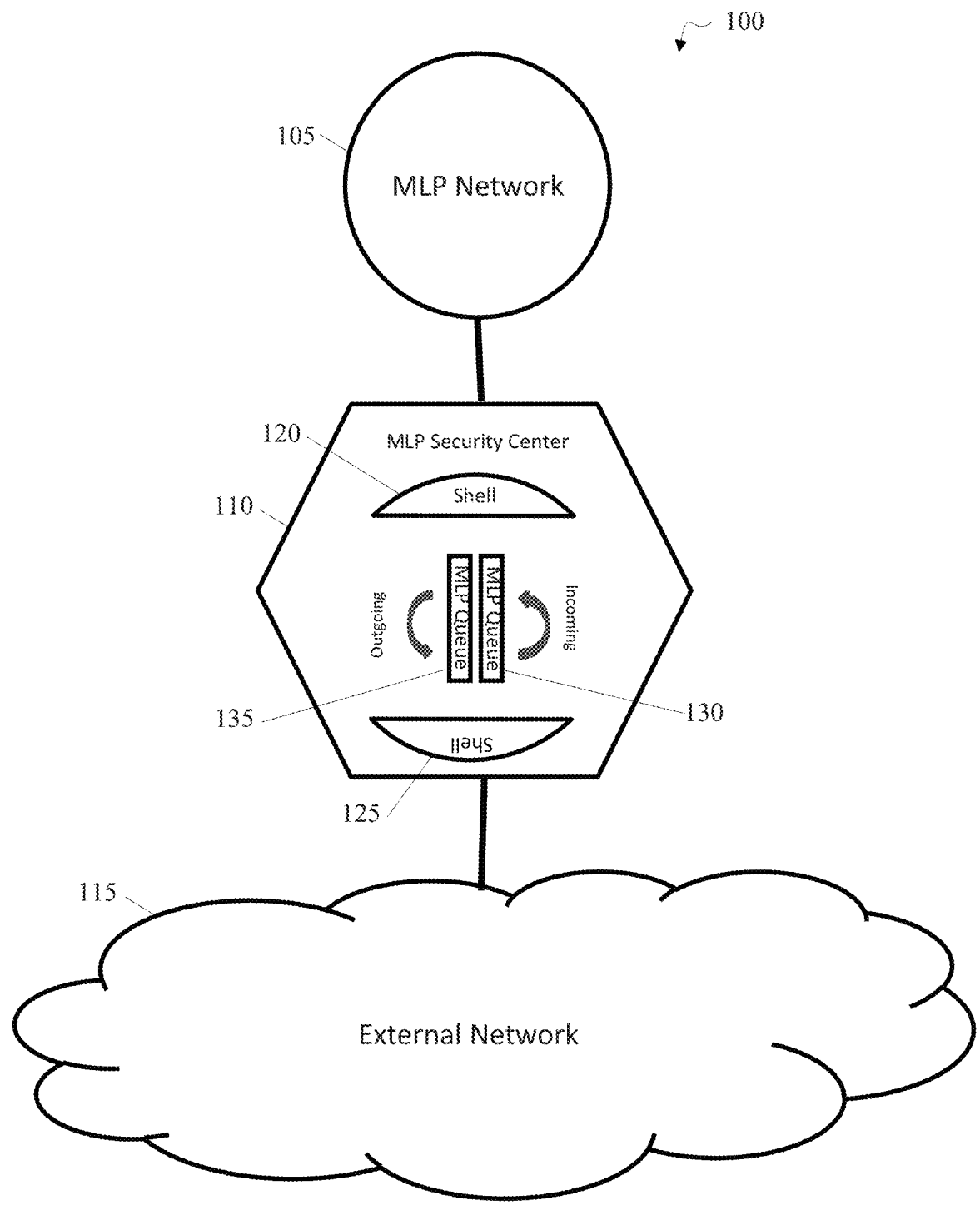
FIG. 1 is a high level diagram illustrating an example configuration of a system including one Multi-Level Protection (MLP) Network and one MLP Security Center according to at least one embodiment of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it is apparent to one skilled in the art that the present invention may be practiced without the specific details presented herein. Furthermore, well known features may be omitted and/or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention include a multi-level cybersecurity system that consists of any combination of Multi-Level Protection (MLP) Security Centers and MLP Devices. As understood herein, an MLP Security Center can be a hardware and/or software interface between different parts of an MLP Network (defined below), and/or between one MLP Network and another MLP Network, and/or between an MLP Network and other networks, e.g. external networks. An MLP Device can be a device that can run an MLP Client (defined below). For example, an MLP Device may be a computer, phone, printer, scanner, motion sensor, security camera, microwave, etc. An MLP Network can consist of all (or some) internal network assets which either use MLP Clients, an MLP Protocol (defined below), and/or are secured by an MLP Security Center, such as, for example, a demilitarized zone (DMZ, defined below). An MLP Network can also consist of a plurality of subnetworks.

An MLP Client can be a software program running on an MLP Device to implement features of an MLP cybersecurity system as described herein. The MLP Client can run MLP Applications (Apps), which can be installed on various elements of an MLP Network to, for example, further implement the MLP cybersecurity system, as described herein. The MLP Protocol can include a single protocol that can be used for communication within the MLP Network, or can include a class and/or set of MLP Protocols. For example, in some embodiments, various MLP Networks and/or various parts of a particular MLP Network can have various MLP Protocols. In some embodiments, the MLP Protocol implemented in a given network configuration can be determined, e.g., by a network administrator and/or an MLP Administrator Control Center (described herein).

The MLP Client can receive and/or send data in an MLP Protocol. This can allow for defending against attacks involving incoming and/or outgoing messages, monitoring physical ports, input/output devices, MLP devices, files and/or threats, identifying sniffers and/or devices which are illegally connected to the internal network, etc.

In various embodiments, an MLP Network can have only MLP Security Centers protecting its devices, with or without MLP Clients, or can consist of a network of MLP Devices with or without any MLP Security Centers. MLP Clients can monitor and perform actions on their host devices, and modify packets that are transmitted within the MLP Network. This can be accomplished, for example, by the modification and/or encryption of network traffic.

In various embodiments, MLP Security Centers can protect MLP Networks from unknown protocols, drivers, software, firmware, or backdoors, even if these are embedded inside an operating system and/or inside hardware. These embodiments can protect against current threats that can include adept organizations that embed unknown malware or spyware in hardware or software which send information without the user's knowledge by using unknown and stealthy protocols.

In some embodiments, protection from unknown protocols can be a product of the architecture of the MLP Security Centers. In some embodiments an MLP Security Center can consist of at least two separate computer clusters called MLP Shells, where the only interface between MLP Shells is through a shared memory (e.g., a shared memory as housed in one or multiple hardware devices).

As understood herein, an MLP Shell can be a computer cluster, typically including at least one network interface that can be part of an MLP Security Center. Each MLP Shell can communicate with at least one other MLP Shell. In some embodiments, each MLP shell communicates with other MLP shells in such a way that no MLP Shell is at all aware of any other MLP Shell. MLP Shells within an MLP Security Center can be independent and/or, in some embodiments, can run different operating systems. In some embodiments, an MLP shell can have no network interface, and, in some embodiments, can be configured to implement various functions within the MLP Security Center.

MLP Shells can be connected only through a shared memory, which can consist of shared RAM and/or hard drives, for example. An MLP Shell can also be implemented by the use of a virtual machine, or combination of both a physical and virtual machine, as described herein.

In some embodiments, MLP Shells within an MLP Security Center do not use a network protocol to communicate among each other, and have no direct network connection. In some embodiments, MLP Shells cannot communicate with one another except by reading and depositing messages into MLP Queues in the shared memory. In some embodiments, the shared memory houses MLP Queues, and the MLP Shells read and write to appropriate MLP Queues according to a set of rules. An MLP Queue, as described herein, can be an object and/or fragment of memory in an MLP Security Center, whose role can be to transfer data between MLP Shells without using network communication protocols.

In some embodiments, MLP Queues may be a shared memory between MLP Shells. These can consist of different data structures, such as queues, stacks, trees, lists, tables, databases, vectors, arrays, linked-lists, a file, or any form of memory which can be shared. These can provide the only means of communication between shells in an MLP Security Center. In some embodiments, MLP Queues may be flexible and/or configurable for a variety of architectures. For example, individual and/or sets of MLP Queues can be dynamically created, destroyed, erased, delayed, etc. Sets of MLP Queues and their subsets can also be assigned to specific purposes, such as different tasks, processes, network locations, etc. And sets of MLP Queues and their subsets can be configured to have different priorities, which can be changed dynamically and/or based on predefined instructions. For instance, a set of MLP Queues can be assigned only to deal with a web server, each one of them with a different priority.

In some embodiments, the rules for MLP Queues can be controlled by the MLP System Administrator Controller. This can add to the security of the network because the different MLP Shells within an MLP Security Center can be isolated and/or unaware of each other (e.g., they are only aware of the MLP Queues by which information can be communicated/transferred), and also because they do not communicate by using network protocols. In some embodiments, Network communications are transferred between the MLP Shells, e.g., by their conversion to a record in an MLP Queue, and the MLP Queue's subsequent reading by another MLP Shell. Network packets, if they are allowed, can then be converted back into the appropriate network protocol and sent on to a destination.

In some embodiments, various actions can be performed on the packets, on the records, and/or on the MLP Queues at any point. In accordance with various embodiments of the invention, any MLP Shell can modify, delete, and/or create any record at any time. For example, an MLP App running on an MLP Shell can be configured to block advertisements and/or add a company's logo to any page, as a predefined (automatic) rule and/or dynamically. This architecture can be an obstacle for the transmission of unknown protocols, even those embedded inside the hardware and/or software of devices in an MLP Network and/or in MLP Shells. In some embodiments of the invention, only certain predetermined MLP Shells can modify, delete, and/or create any record at any time, e.g., based on a permission and/or access control. In some embodiments, a given MLP Shell can have permission to modify, delete, and/or create only certain records, and/or only at certain predetermined times. As such, the MLP cybersecurity system can be configurable for a variety of different settings and/or environments.

The architecture of MLP Security Centers can enable various network configurations to enable MLP security. For example, connecting different networks via MLP Security Centers, as described herein, allows the different networks to have very different configurations. For example, this allows each network to use different MLP Protocols, different encryptions, run different MLP Apps, use different network monitoring tools (MLP Apps), have different rules, etc., yet the architecture of the MLP Security Center will still allow the different networks to communicate. Such a diversity of rules and protocols can significantly fortify the networks as a whole; even more than it would each individual network otherwise. This queue-shell architecture can make a separation between different networks, enables installation of apps in each shell independently, without, for example, interfering with one another, etc. In addition, it can allow working with different protocols in each network, different tools to monitor each network, for example, different encryptions in each network, yet still enabling communication between the networks. These and other features are described herein with reference to the figures.

FIG. 1 is a high level diagram illustrating an example configuration of a system 100 including one MLP Network 105 and one MLP Security Center 110 according to at least one embodiment of the invention. MLP Security Center 110 has at least one inner MLP Shell 120, and at least one outer MLP Shell 125. In some embodiments, in a network configuration with only a single MLP Security Center 110, the MLP Security Center 110 can be configured to act as the relay between the MLP Network 105 and an external network 115. In this case, MLP Security Center 110 is the only interface between the MLP Network 105 and the external network 115. The inner MLP Shell 120 has no access to any external network 115 and must deposit any information which is intended for the external network 115 into the outgoing MLP Queue 130, which will be read by the outer MLP Shell 125. This simple system can be scaled to a larger number of MLP Shells in a straightforward manner.

As explained herein, packets of information can be transferred between inner MLP Shell 120 and outer MLP Shell 125 via at least one outgoing MLP Queue 130 and at least one incoming MLP Queue 135. In this case, and for an MLP Security Center 110 with only two MLP Shells 120 and 125, the internal MLP network 105 can only interact with the inner MLP Shell 120, while the external network 115 can only interact with the outer MLP Shell 125. In some embodiments, any incoming network protocol from external network 115 can be converted into a record by the outer MLP Shell 125 before being deposited into the incoming MLP Queue 135, and converted into a network protocol after being read by the inner MLP Shell 120 before being sent to the MLP Network 105, and vice versa.

In some embodiments, the MLP Shells 120 and 125 are disconnected from each other, and/or each can be unaware of the other's existence. In these embodiments, damage due to known and unknown threats in the MLP Network 105 that use internet protocols can be prevented. Damage from such threats can be prevented because, in these embodiments, the architecture of the overall MLP Network 105 does not support (e.g., blocks or otherwise prevents) internet protocols between the shells. Each MLP Shell (120 and 125) can monitor, read, and/or write to any queue. In some embodiments, the architecture easily monitors and/or controls traffic in the MLP Network 105. It should be noted that the notation of MLP Shells as inner MLP Shells and outer MLP Shells (and as 120 and 125) is intended only to delineate that there are at least two shells (e.g., a cluster of two computing devices), each of which is connected with another aspect of the network, and which communicate and interface only via MLP Queues. Likewise, it should be noted that the notation of MLP Queues as outgoing MLP Queues and incoming MLP Queues (and as 130 and 135) is intended only to delineate that, in some embodiments, there are at least two queues, each of which of which can be configured to handle traffic in a given direction.

Figure 2:
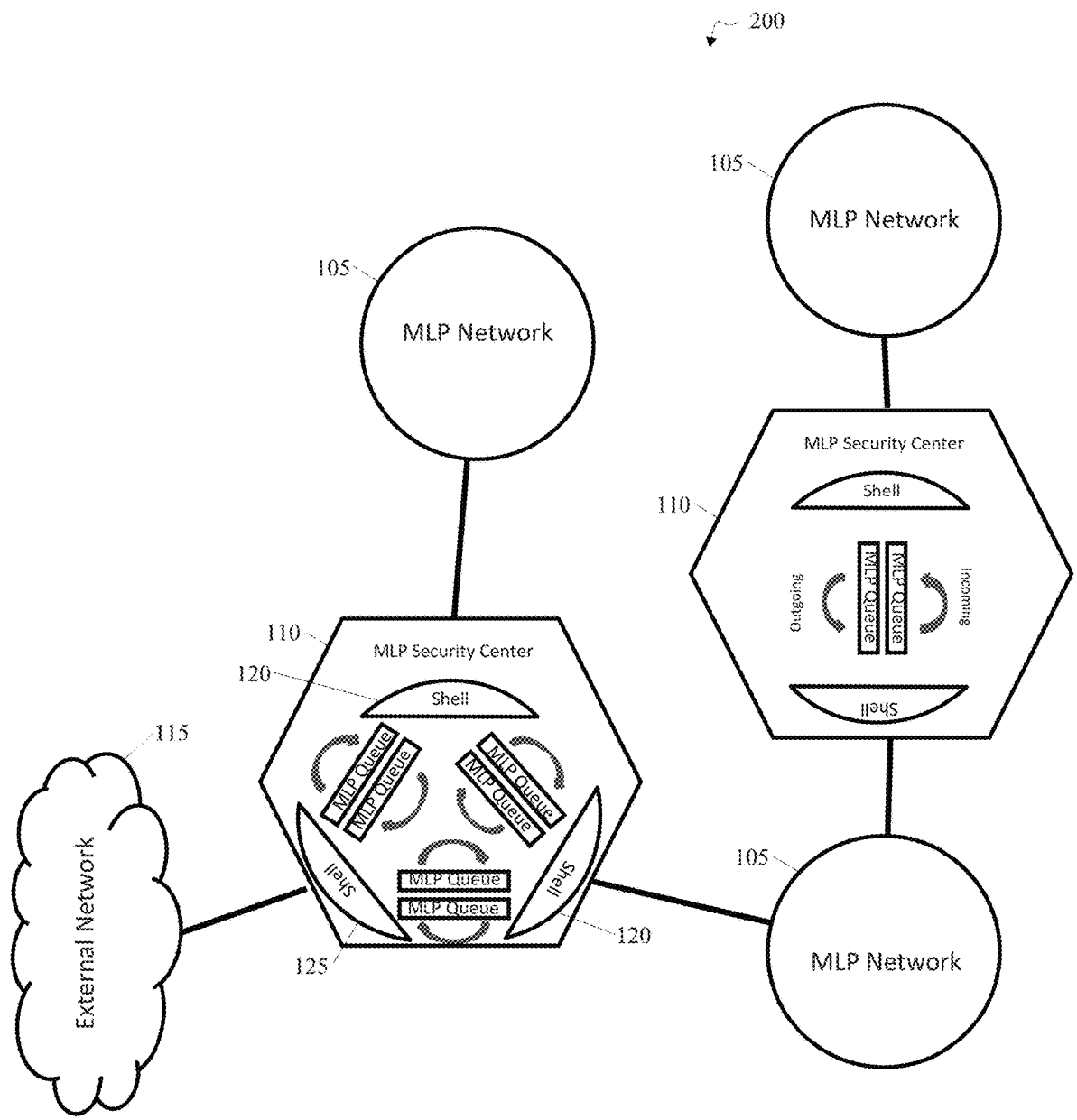
FIG. 2 is a high level diagram illustrating an example configuration of a system including a plurality of MLP Networks and a plurality of MLP Security Centers according to at least one embodiment of the invention.

As is apparent to one of ordinary skill in the art, the MLP cybersecurity system can also be implemented for other network configurations, as described herein. For example, FIG. 2 is a high level diagram illustrating an example configuration of a system 200 including a plurality of MLP Networks 105 and a plurality of MLP Security Centers 110 according to at least one embodiment of the invention. In this embodiment any interaction between MLP Networks and/or between MLP Networks and an external network (such as the Internet) is controlled and facilitated by MLP Security Centers situated strategically between the various networks.

In some embodiments, a Virtual Private Network (VPN) can be formed between two secured networks. Upon formation of a VPN, the two networks can exchange information about MLP Queues, MLP Protocols, and encryptions. Transmitting information between the two entities involved in the VPN, information from the first network can be sent directly to the appropriate MLP Queues in the second network. In some embodiments, this information is not converted away from the MLP Protocol or decrypted when transmitted from the first network to the second.

Embodiments of the invention can provide secured cloud services, by, for example, creating a VPN, as explained herein. A preconfigured security center can be provided to customers (such as banks and/or financial institutions), which will implement a VPN with the cloud service. The cloud service can have designated MLP Queues for each customer. This can also be useful for load balancing and redundancy, and for effectively combining two MLP networks into one.

Figure 3:
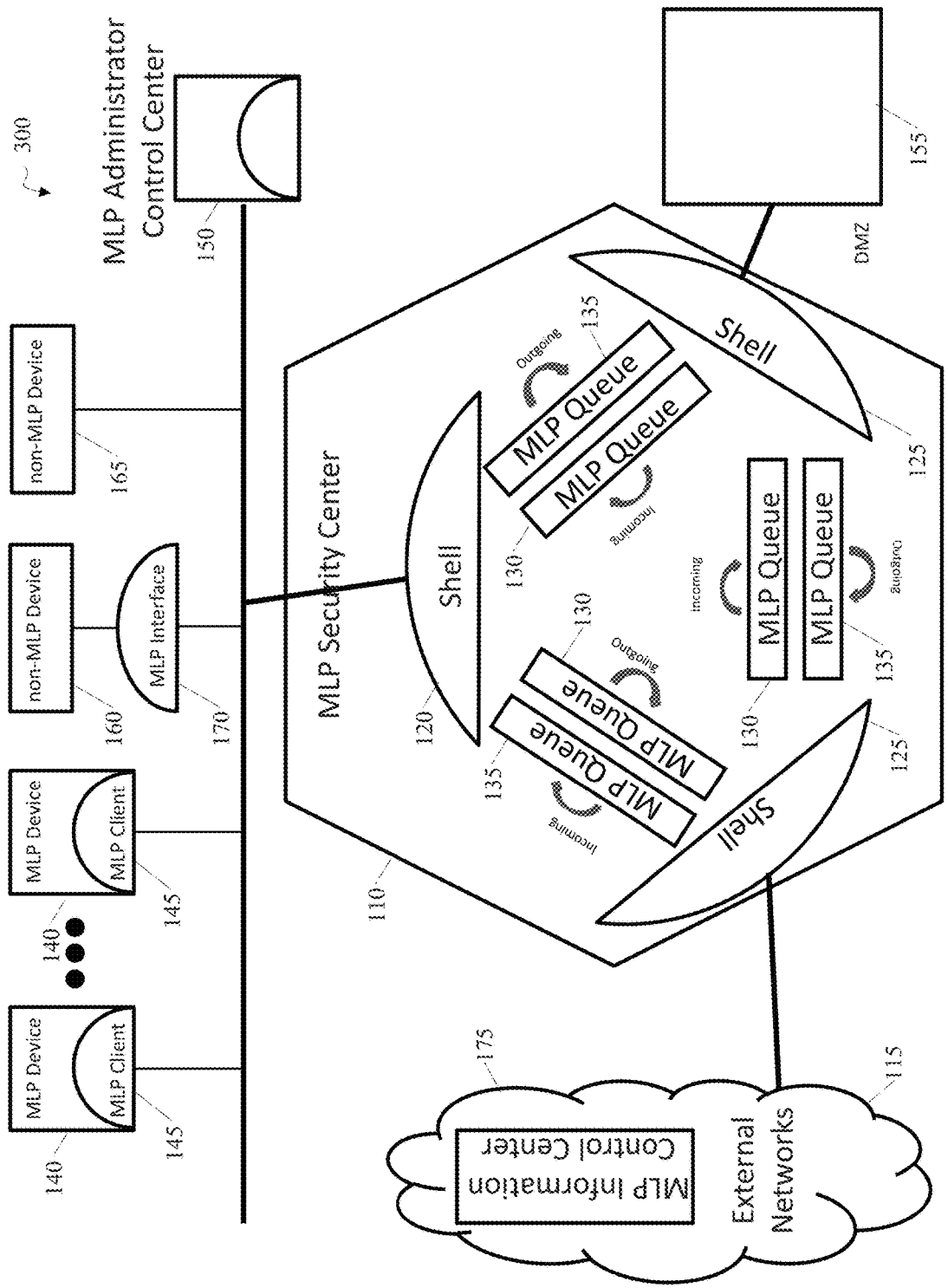
FIG. 3 is a high level diagram illustrating an example configuration of a system including an MLP Security Center interfacing with a plurality of devices and networks according to at least one embodiment of the invention.

FIG. 3 is a high level diagram illustrating an example configuration of a system 300 including an MLP Security Center 110 interfacing with a plurality of devices and networks according to at least one embodiment of the invention. In particular, FIG. 3 is an example of an MLP Network which includes MLP Devices 140, MLP Clients 145, MLP Administrator Control Center 150, a DMZ 155, a non-MLP Protocol compliant device 160 interfaced into the MLP Network by using an MLP Interface 170 (e.g., an MLP Device), a non-MLP Protocol compliant device 165, an MLP Security Center 110 with three MLP Shells 120 and 125, and six MLP Queues 130 and 135. One MLP Shell is designated for external communications (e.g., to enable communication with an MLP Information Control Center 175, described herein) via External Network 115, and one MLP Shell is designated for communications with the DMZ 155.

As understood herein, a DMZ or demilitarized zone (sometimes referred to as a perimeter network) can be a physical, virtual, and/or logical subnetwork that contains and/or exposes an organization's external-facing services to a less trusted network, usually the internet. For example, web servers, Application Programming Interfaces (APIs), and mail servers can be placed in a DMZ. These can be prime targets for a cyber-attack, as they often provide an unprotected entry point, and therefore protection via the MLP cyber-security system may be paramount.

In some embodiments, one or more network assets can have an MLP Client 145 installed on them (e.g., MLP Devices 140). The function of MLP Client 145 can be many-fold, depending on the embodiment and desired implementation. The MLP Client 145 can have complete control over all incoming and outgoing network traffic into and/or out of its MLP Device 140 (e.g., the device on which it is installed or otherwise configured to control). The MLP Client 145 can be configured to be in charge of converting traffic between ordinary network protocols and MLP Protocols, and vice versa. It can also be in charge of modifying, encrypting, and/or decrypting traffic as specified in its rules (e.g., in predefined or dynamic rules) regulating its operation. MLP Client 145 can also be configured to monitor and control some or all physical ports of a device, and can take action depending on their activity. For example, it can dynamically disable them if so-configured. In some embodiments, since MLP Client 145 monitors its MLP Device 140, an MLP Client 145 can communicate information using a distinct or particular MLP Protocol, which can include information such as the filename, file version, date last modified, checksum, etc., of files that are involved in sending packets and the packets' destination.

In some embodiments, this information can be used to determine, e.g., according to a set of rules, which actions should be taken by the MLP Client 145 in response to an outgoing packet. For example, a packet can be sent, dropped, blocked, and/or logged. In some embodiments, the MLP Device 140 can be disconnected from the network completely. Similar action can be taken in response to incoming packets, according to a set of rules. Besides network communication, MLP Clients 145 can also monitor other aspects of their MLP Devices 140. For example, in some embodiments, an MLP Client 145 can monitor the state and actions of its MLP Device 140. In some embodiments, MLP Clients communicate with other MLP clients and with the MLP Security Center 110 using an MLP Protocol. Each MLP client 145 follows a set of rules that it receives from the MLP System Administrator Controller 150, which is a module which can be used to configure an MLP Network or parts thereof.

For instance, if an MLP Client 145 detects that a memory stick was connected to its MLP Device 140, it may take action according to rules. Actions can include, but are not limited to, notifying an appropriate entity (such as an administrator), logging the event, unmounting and/or ejecting the memory stick, disconnecting the MLP Device 140 from the network, and/or shutting down the MLP Device 140. Therefore, the scope of the MLP Client's possible actions is vast. In addition, MLP Client 145 can have the ability to run MLP Apps. These apps can be used, for instance, to study a network and learn its ordinary operation, etc. In some embodiments, MLP Security Centers 110 can similarly have the ability to run MLP Apps.

In addition, in some embodiments the MLP Client 145 can log events. Logs may be sent, e.g., to an MLP Information Control Center 175 (e.g., according to rules), and/or to MLP System Administrator Controller 150. MLP Information Control Center 175 can be a database of configurations, rules, and other information which can assist in the installation, proper operation, and maintenance of an MLP Network. While MLP Information Control Center 175 is shown in FIG. 3 as being connected via External Network 115, in other embodiments, MLP Information Control Center 175 may be part of the MLP Network 105.

In some embodiments, MLP Information Control Center 175 can be a database that stores configurations and security rules for the MLP system and records the history of security breaches. Upon installing and/or updating, the MLP Security Center 110 can download from the MLP Information Control Center 175 the recommended configuration and rules needed to function securely. The rules can be installed on the MLP Security Center 110 and distributed to the MLP Devices 140, MLP Clients 145, MLP Interface 170, etc. This will allow a new system to be installed quickly and without much technical expertise in MLP administration. In some embodiments, all the configurations and rules can be backed up in the MLP Information Control Center 175 and/or to MLP System Administrator Controller 150, and will be available for recovery. The system administrator can change those rules for each element of the MLP Network 105. The rules can indicate permissible and prohibited activity, and can dictate one or more actions of the various devices in the network, e.g., in response to events and their abstractions. In some embodiments, the backups can include the configuration of the entire MLP Network. This can include configuration of the queues, devices, shells, rules, etc.

In some embodiment, if shared network devices exist which cannot install MLP Clients 145, they can be included in the MLP Network 105 by either interfacing them with the MLP Network 105 using an MLP Interface 170, which can relay the information to the non-MLP device 160 (e.g., according to a set of rules), or alternatively, by allowing communications with these devices using non-MLP Protocols. For example, in some embodiments, MLP Shells 120 can use MLP Protocols and can convert them into other protocols. Such non-MLP devices (e.g., non-MLP Device 165) might include printers, scanners, external hard drives, etc. As understood herein, an MLP Interface 170 can be a software module configured to interface between elements of MLP Network 105 and a device that does not (and/or cannot) have an MLP Client installed, e.g., non-MLP devices 160 and 165. Other examples in which MLP cyber-security system functionality can be implemented include an MLP Adapter (described below), an MLP Router, an MLP Switch, an MLP Hub, an MLP Access point, among others, each of which can consist of multiple shells, multiple MLP Queues and multiple network adapters which provide their respective functions along with the MLP technology.

In some embodiments, an MLP Interface 170 can be hardware and/or software module which, when installed, can implement certain functionalities of an MLP client 145. For example, MLP Interface 170 can be used to protect one or multiple non-MLP devices 165 by connecting directly to the network without the need of an MLP Client 140 installed on the non-MLP devices 165, and/or in instances where MLP Client 145 cannot be installed. MLP Interface 170 can have the ability to use MLP protocol and encryption. It also has the ability to connect to other networks using the MLP Security Center 110. An MLP Interface can be updated via the MLP Information Control Center 175 and/or to MLP System Administrator Controller 150.

It should be noted that, in some embodiments, an MLP Security Center, MLP Adapter, MLP Router, MLP Switch, MLP Hub and MLP Access Point can also be implemented by a single CPU cluster (e.g., as a single multi-purpose MLP Shell) with shared memory; however, such an implementation may not enjoy the full advantages of a physically-separated MLP Security Center. For example, this implementation may not secure a network from unknown embedded protocols. Furthermore, an MLP Security Center, MLP Adapter, MLP Router, MLP Switch, MLP Hub and MLP Access Point can also be implemented using virtual machines on one or more computers, e.g., on an SQL server with shared memory. Such an embodiment may not enjoy the full advantage of a physically separated MLP Security Center 110.

As understood herein, an MLP Protocol is a network protocol that can be used in the MLP Network 105. In some embodiments, an MLP Protocol may not be required for the implementation of an MLP Network, but can improve an MLP Network's security. In some embodiments the MLP Protocol can consist of appending information to packets and/or encryption of packets. For example, an MLP Protocol can consist of adding identifying information for each device and/or software that is/are involved in the sending of a packet (such as physical locations, file locations, file sizes, dates modified, filenames, names of developers and/or creators, file descriptions, file types, file versions, product versions, languages, checksums, and other parameters). The information may be checked by elements of an MLP Network 105, and action can be taken according to a set of rules. If the information in the MLP Protocol packet has invalid identifying information, or the protocol itself, then action can be taken according to a set of rules. For example, the packets may not be allowed to reach their destination, and can be dropped, logged, and/or reported. In some embodiments, actions can be taken against the packet's originator. For example, the originator can be disconnected from the MLP Network. In some embodiments, logs can be sent to the MLP Information Control Center 175 and/or to MLP System Administrator Controller 150.

The use of MLP Clients 145 from within the MLP Network also provides a barrier for attacks from within the network. In some embodiments, the MLP Client 145 not only protects an MLP Network from threats from external networks, but it can also protect against actors with physical access to MLP Network assets. For example, an MLP Client can monitor the state and actions of its MLP Device, and can for instance take action upon the insertion of a memory stick and/or other unauthorized hardware/software.

Figure 4:
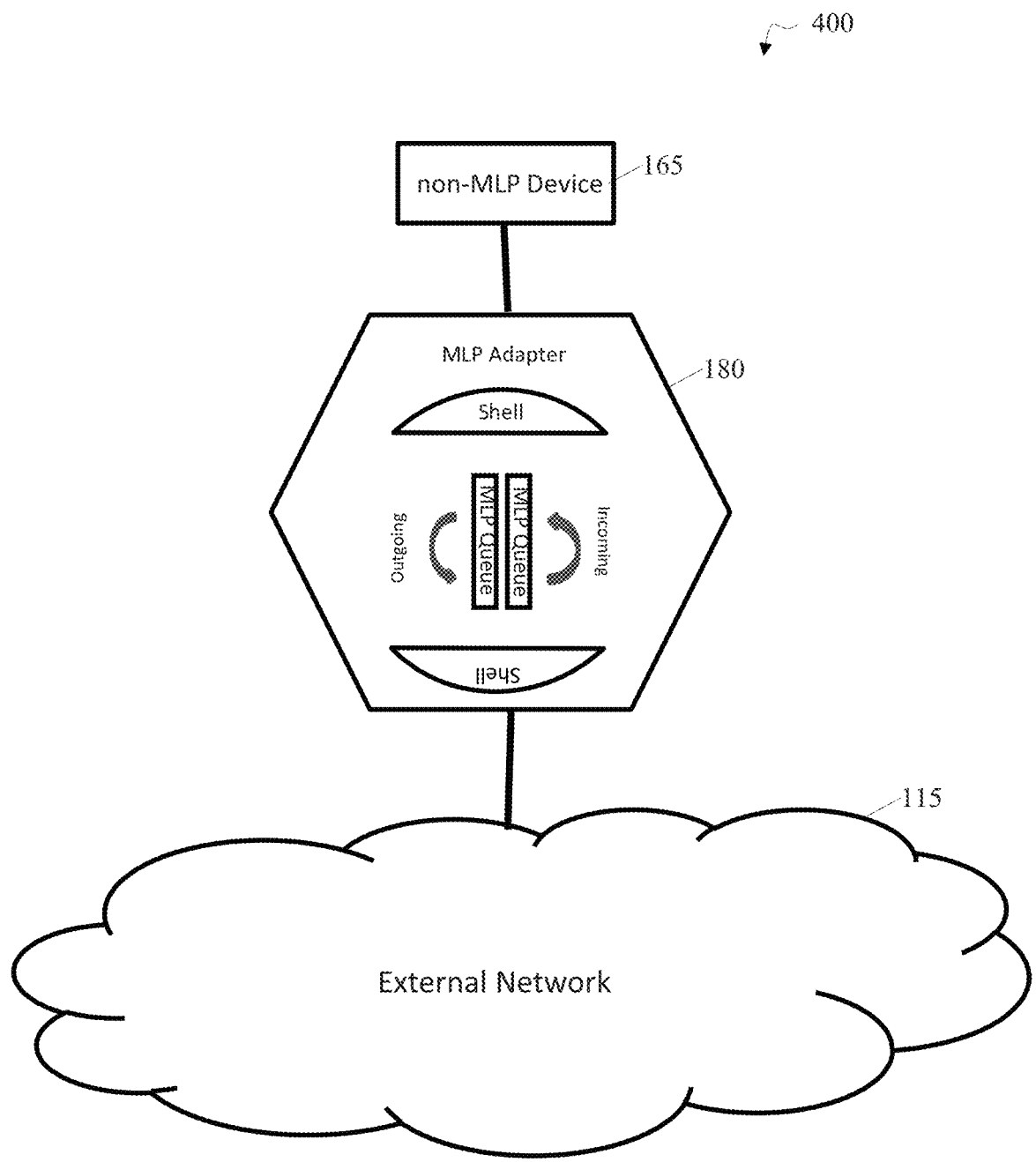
FIG. 4 is a high level diagram illustrating an example configuration of a system including an MLP Security Center interfacing with a non-MLP Device and an External Network according to at least one embodiment of the invention.

The use of an MLP Protocol acts to further secure MLP Networks by making inspection of network traffic more robust. Properties of the files involved in network traffic can be included in the packets, which allows for the inspection not only of traffic, but also for the inspection of the sources of traffic. Rules can be applied to MLP Protocol packets by elements of the MLP Network. An MLP Protocol can also be encrypted. Network assets that cannot use MLP Protocols can also be included in an MLP Network. These can either be interfaced into an MLP Network by MLP Interfaces 170, connected via MLP Adapter 180, or alternatively, non-MLP Protocols can be used to communicate with such devices. For example, FIG. 4 is a high level diagram illustrating an example configuration of a system 400 including an MLP Adapter 180 interfacing with a non-MLP Device 165 and an External Network 115 according to at least one embodiment of the invention. Provided the MLP Adapter 180 is configured and enabled to convert MLP Protocols to non-MLP protocols, the non-MLP Device 165 can interact with the External Network 115.

One purpose of MLP Adapter 180 can be to protect computers and small businesses, by eliminating the need of installing and managing MLP Clients. An MLP Security Center 110 may not be strictly required in such a embodiment. In some embodiments, using an MLP Adapter 180, a non-MLP Device 165 can be included in an MLP Network 105 without having an MLP Client 145 or MLP Interface 170 installed. This can be beneficial because some network devices, such as printers and/or scanners, are less amenable to software installation, and therefore, an MLP Client 145 might not be easily installed on such devices. Also, administrators can use an MLP Adapter 180 instead of installing an MLP Client 145 on a device or providing an MLP Interface 170. This can be done by connecting the non-MLP Device 165 and the MLP Network 150 via an MLP Adapter 180. The MLP Adapter 180 can understand the appropriate MLP Protocol (which will be used to communicate with non-MLP Device 165) and convert it into a protocol which can be understandable to non-MLP Device 145.

MLP Adapter 180 can be used to protect one or multiple non-MLP Devices 165 by connecting directly to the internet without the need of an MLP Client 145 installed on the non-MLP Devices 165, and/or to protect MLP Devices 140. An MLP Adapter 180 can have the ability to use MLP protocol and encryption. It also has the ability to connect to other networks, e.g., using the MLP Security Center 110. An MLP Adapter 180 can be updated, e.g., via the MLP Information Control Center 175, and the rules on the MLP Adapter 180 can be modified. The purpose of an MLP Adapter 180 is to protect computers and small businesses, by eliminating the need of installing and managing MLP Clients 145. Aside for connecting non-MLP Devices 165, MLP Adapter 180 can be used, e.g., to protect a single computer or a small network of computers (e.g. a residential network) without the necessity of installing an MLP Client 145. While an MLP Adapter may not have the full capabilities of MLP Security Center 110 and MLP Client 145, the same shell-queue architecture can be provided by MLP Adapter 180 to enable MLP security as described herein. Therefore, in some embodiments, an MLP Client 145 may still be installed even when MLP adapter is used, to provide the additional security benefits of the MLP Client 145.

Turning back to FIG. 3, MLP System Administrator Controller 150 can be the main control center for an MLP Network 105, and can be used to configure any aspect of the MLP Network. Its functions can include: creating, deleting, modifying rules and definitions; controlling (installing, enabling, disabling, pausing, resuming, freezing, unfreezing) of MLP Apps; creating, deleting, erasing, and/or pausing queues; allocating resources (such as MLP Queues and MLP Shells) to a group of services and/or processors; enabling logs to be viewed; investigating the state of an MLP System (system forensics); wiping a queue clean; pausing and resuming queue operation; monitoring and/or controlling MLP Devices' permissions and rules; managing (enabling, disabling, configuring, updating, installing, uninstalling, etc.) the MLP Apps.

In some embodiments, MLP Apps can be installed on any element of an MLP Network. Examples for possible MLP Apps can include: obtaining network statistics; advertisement blocker; system forensics; network forensics; many machine learning projects; analysis of behaviors in the MLP Network; network pattern detection; detection of large file transfers; detection of anomalous activity (file transfers, rapid logins, abnormal login times, etc.); non-password user identification; detection of periodic activity (file transfers, etc.); detection of computer-controlled activity; detection of computer-controlled network transactions (file transfers, file corruption, etc.); discrimination between human and computer activity; pinging MLP Clients to check online status; mail gateway; SMTP server; antivirus/antispyware; and DDOS protection, by, e.g., implementing a time delay on an MLP Queue and/or discriminating between real requests and attacks and/or encrypting of data between an MLP Client which is installed on an external network and the MLP Security Center 110.

There are many types of DDoS (Distributed Denial of Service) attacks. The goal of these attacks is to prevent a server from serving legitimate clients and/or crashing the server. To accomplish this, some attacks overload a server's network resources, some attacks overload a server's computing resources, some attacks overload a server's memory resources, some attacks overload a server's disk space resources, and some attacks overload a network's resources. For example, in a SYN flood attack, which is a form of denial-of-service attack, an attacker sends a succession of SYN ("synchronize") requests to a target's system, forcing it to wait for many ACK ("acknowledgement") responses, in an attempt to consume enough server resources to make the system unresponsive to legitimate traffic. Some systems may also malfunction or crash when other operating system functions are starved of resources in this way.

By construction, the MLP Security Center has very dynamic and fine control over responses to incoming signals. Importantly, the System can prevent the (ubiquitous) automatic reflex-like SYN-ACK response to SYN packets. This is crucial because it is exactly this (ubiquitous) reflex-like ACK response that is typically exploited for DDoS SYN attacks.

In some embodiments of the System, the interface of the MLP Security Center with an external network can be as follows. A firewall, e.g. iptables, is set to drop all incoming traffic. Using a link-layer driver, for example, WinCapture (e.g., in a Windows-type firewall), the server on the MLP Shell monitors all network communications arriving at the network card. The link layer, as used herein, is used to move packets between the Internet layer interfaces of two different hosts on the same link. The processes of transmitting and receiving packets on a given link can be controlled both in the software device driver for the network card.

In some embodiments, an MLP App on the MLP Shell can decide what to do with the incoming signals. For instance, the MLP App can decide that it does not respond to any SYN packet. Such a configuration disables/prevents the automatic reflex-like SYN-ACK response to SYN packets. Furthermore, in some embodiments, the MLP App can also refuse to forward any SYN requests to their specified destination. The MLP App can also respond to a SYN request on behalf of another device; these ingredients suffice for protecting against SYN Flood DDoS attacks, as seen below. The MLP App can also forward some output to another MLP App, e.g., of the same shell or on another MLP shell.

In some embodiments of the System, an MLP Shell can be designated to track and respond to SYN requests on behalf of the server. In some embodiments, this MLP Shell can have the right to overbook resources, e.g., processing and memory resources. This can be done for at least the following considerations. Assuming all requests are legitimate, if too many users try to handshake, the server will not be able to service all of them regardless. Therefore, overbooking does not create a problem. It does, however, foil the SYN attack. In some embodiments, the handshaking MLP Shell can store the incomplete handshakes in some type of data structure, called, e.g., an MLP SYN data structure, and log the requests. Once a user completes a handshake, the handshaking MLP Shell can forward the handshake sequence (spoofing the real external client) to the intended server. For example, in some embodiments, the MLP shell can spoof the internal server's IP address when performing a handshake with the external client. Conversely, the MLP shell can spoof the external client's IP address when performing a handshake with the internal server. A result is that both the server and external client complete a handshake, and communication between the client and server could commence. This is because both the client and server, having completed a 3-way-handshake sequence, are unaware of the benevolent "man-in-the-middle".

In one embodiment, non-completed handshakes are logged and stored in a data structure, to be investigated. Investigation could be deep, depending on the (extremely flexible) MLP App chosen. In some embodiments, an MLP App could employ correlation and other statistical methods to analyze the data about the completed and incomplete handshakes. In some embodiments, this data could be shared, e.g., with the corporate MLP Information Control Center, between security companies, and/or with other MLP System customers. This could yield to preventative measures or warnings of impending or imminent attacks. Indeed, attacks on multiple customers can be correlated, especially given the number of DDoS-capable attackers.

In some embodiments of the System, a credit system can be applied to potential clients, as explained herein. When a packet reaches the MLP Security Center, it will first be analyzed, and its 'credit' will be checked. Credit can be calculated based on any packet data, including but not limited to its reported IP addresses, its MAC address, their relationship to the actual physical server which forwards them (e.g. does this IP address always communicate through this server?), the time of day, amount of packet payload, content of packet payload, and based on other incoming traffic, like the load, amount of geographically proximate IP addresses, the type of payload expected, etc. The packet can be prioritized and placed in an MLP Queue based on its credit. Some Queues forward packets to its destination without delay, some MLP Queues will give its packets lower priority, delaying the traffic. Other MLP Queues will delay its packets more, and other MLP Queues can run a deep analysis of the packets before considering whether to forward them. As a result of the analysis, packets could be dropped, for example. The packets can be analyzed, and the credit system can be updated. In some embodiments, these 'credit scores' could be shared with the MLP Information Control Center, which could also share this information with other MLP System Networks (e.g., customers).

The combination of prioritizing packets and queuing system can allow legitimate requests access to the server, while most malicious requests can be denied service. Using this process, in some embodiments, it would still be possible for a small sum of malicious requests to reach the intended destination server. However, this system would prevent the damage caused to the system by deprioritizing malicious requests and pushing them to the back of the queue based on the credit score, so that they cannot overwhelm the server like a DDoS usually does.

While in some embodiments packet analysis could be performed on an individual basis, the statistics of many packets could be a better indicator of an ongoing or impending attack. The clearest example is that a sudden jump in traffic volume might inform an MLP App of an attack. An uptick in volume can be defined based on many statistics or information including, but not limited to the following; how much traffic would the client be expected to have on a certain day of the week, a month, time of day, holiday, etc. Also, since reported IP addresses correspond to physical locations, MLP Apps could utilize, for example, the time of day in said locations, check whether a significant portion of the traffic is coming from a similar location, or from random places—each scenario could spell trouble (perhaps of a different kind). For example, it can be important to identify through which physical server the packets passed. Passing through the 'wrong' physical servers could indicate IP spoofing (for instance, if a California IP address arrives at New York through a cross-Atlantic cable). Also, an MLP App could raise an alarm if too many packets have bizarrely-similar payloads.

MLP System Administrator Controller 150 can be constructed in accordance with one or more embodiments of the invention. In some embodiments, MLP System Administrator Controller 150 may be a stand-alone computer system. In other embodiments, MLP System Administrator Controller 150 may include a network of operatively connected computing devices, which communicate over a network. Therefore, MLP System Administrator Controller 150 may include multiple other processing machines such as computers, stationary devices, mobile devices, terminals, and/or computer servers (collectively, "computing devices"). Communication with these computing devices may be, for example, direct or indirect through further machines that are accessible to the network.

MLP System Administrator Controller 150 may be any suitable computing device and/or data processing apparatus capable of communicating with computing devices, other remote devices and/or computing networks, receiving, transmitting and storing electronic information and processing requests as further described herein. MLP System Administrator Controller 150 is, therefore, intended to represent various forms of digital computers, such as laptops, desktops, workstations, personal digital assistants, servers, blade servers, mainframes, and other appropriate computers and/or networked or cloud based computing systems capable of employing the systems and methods described herein.

MLP System Administrator Controller 150 may include a server processor which can be operatively connected to various hardware and software components that serve to enable operation of the system. The server processor (not shown) serves to execute instructions to perform various operations relating to MLP security, and other functions of embodiments of the invention as will be described in greater detail below. Server processor may be one or a number of processors, a central processing unit (CPU), a graphics processing unit (GPU), a multi-processor core, or any other type of processor, depending on the particular implementation. System server may be configured to communicate via a communication interface with various other devices connected to the MLP network. For example, the communication interface may include but is not limited to, a modem, a Network Interface Card (NIC), an integrated network interface, a radio frequency transmitter/receiver (e.g., Bluetooth wireless connection, cellular, Near-Field Communication (NFC) protocol), a satellite communication transmitter/receiver, an infrared port, a USB connection, and/or any other such interfaces for connecting the MLP System Administrator Controller 150 to other computing devices and/or communication networks such as private networks and the Internet.

In certain implementations, a server memory can be accessible by the server processor, thereby enabling the server processor to receive and execute instructions such as code, stored in the memory and/or storage in the form of one or more software modules, each module representing one or more code sets. The software modules may include one or more software programs and/or applications (collectively referred to as a "server application") having computer program code and/or a set of instructions executed partially or entirely in the server processor for carrying out operations for aspects of the systems and methods disclosed herein, and may be written in any combination of one or more programming languages. The server processor may be configured to carry out embodiments of the present invention by for example executing code and/or software, and may be or may execute the functionality of the modules as described herein.

It should be noted that, in accordance with various embodiments of the invention, server modules may be executed entirely on MLP System Administrator Controller 150 as a stand-alone software package, partly on MLP System Administrator Controller 150 and partly on a remote device, entirely on a remote device, partly on MLP System Administrator Controller 150 and partly on a third-party server, or entirely on a third-party server.

Server memory may be, for example, a random access memory (RAM) and/or any other suitable volatile or non-volatile computer readable storage medium. Server memory may also include storage which may take various forms, depending on the particular implementation. For example, the storage may contain one or more components and/or devices such as a hard drive, a flash memory, a rewritable optical disk, a rewritable magnetic tape, or some combination of the above. In addition, the memory and/or storage may be fixed or removable. In addition, memory and/or storage may be local to the MLP System Administrator Controller 150 or located remotely.

In accordance with further embodiments of the invention, MLP System Administrator Controller 150 may be connected to one or more database(s), for example, directly or remotely via the MLP network. Such databases may include any of the memory configurations as described above, and may be in direct or indirect communication with MLP System Administrator Controller 150. In some embodiments, these databases can store the results/outputs of various modules, as described herein, and can represent a plurality of separate databases and/or partitions in a single database.

MLP Device 140 can be any standard computing device. As understood herein, in accordance with one or more embodiments, a computing device may be a stationary computing device, such as a desktop computer, kiosk and/or other machine, each of which generally has one or more processors configured to execute code to implement a variety of functions, a computer-readable memory, a client communication interface for connecting to the network, one or more client modules, one or more input devices, and one or more output devices. Typical input devices may include a keyboard, pointing device (e.g., mouse or digitized stylus), a web-camera, and/or a touch-sensitive display, etc. Typical output devices may include one or more of a monitor, display, speaker, printer, etc. As described herein, such devices can also be connected and/or protected, directly or indirectly, by MLP Security Center 110 (e.g., via MLP Interface 170).

Additionally or alternatively, a computing device may be a mobile electronic device ("MED"), which can be generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, a computing device may be a "dummy" terminal, by which processing and computing may be performed on MLP System Administrator Controller 150, and information may then be provided to the device via the server communication interface for display and/or basic data manipulation. In some embodiments, modules depicted as existing on and/or executing on one device may additionally or alternatively exist on and/or execute on another device. In some embodiments, a third-party server may provide the same or similar structure and functionality as MLP System Administrator Controller 150, but may be owned, possessed, and/or operated by a third-party.

Figure 5:
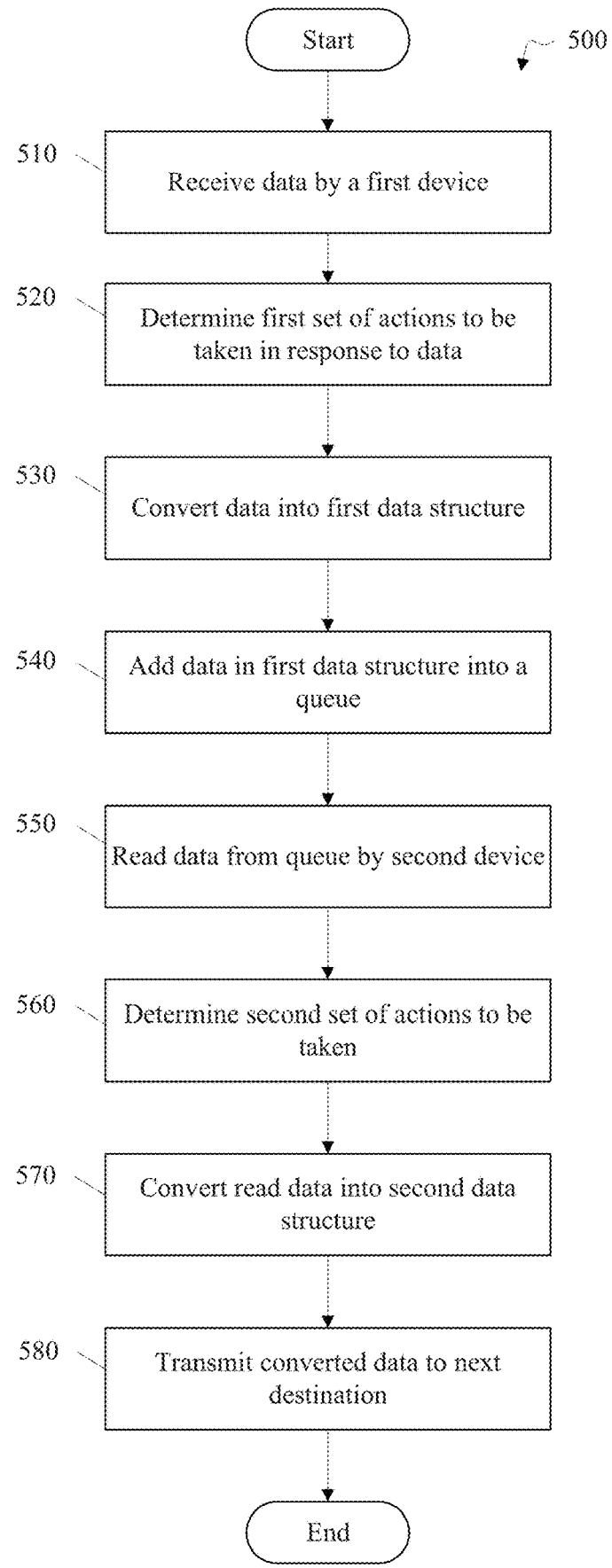
FIG. 5 is a flow diagram of a method for providing multi-level protection in a network environment, according to at least one embodiment of the invention.

FIG. 5 is a flow diagram of a method 500 for providing multi-level protection in a network environment, according to at least one embodiment of the invention. At step 510, a first device/server (e.g., a device within the MLP Network, or a server of the network) receives data having a next destination of a second device/server (e.g., another device within the network or a server of another network). In some embodiments, the data can be in a first format that is a) specific to the second device/server, b) specific to the first device/server, c) specific to another computing network, d) encrypted, and/or e) any combination thereof.

At step 520, the first device/server can determine a first set of one or more actions to be taken in response to the data (e.g., based at least in part on the data). In some embodiments, the first set of one or more actions can include transmitting the data to one or more applications on the first device/server (e.g., for analysis), alerting safety personnel, etc. In some embodiments, the first set of one or more actions can be based on a set of security rules, which can be predefined and/or dynamic. In some embodiments, the first set of one or more actions can include transmitting, rejecting, denying, dropping, modifying, forwarding, rerouting, logging, or passing the data to an application, or any combination thereof. In some embodiments, determining can include vetting the data, deciding into which queue to place (add) the data (which can determine which physical/virtual computer becomes the second device/server, as described in step 540 below). In some embodiments, the first set of one or more actions can be determined by an app, e.g., an MPL App installed on the device/server. In some embodiments, determining the first set of one or more actions can be based on the content or other features of the data itself, e.g., by analyzing the content or other features of the data.

At step 530, the first device/server can convert the data having the next destination of the second device/server into a first data structure or format. In some embodiments, the conversion can include encrypting the data, adding additional data to the received data, or any combination thereof. In some embodiments, the first data structure can be based on a set of one or more security rules, which can be predefined, dynamic, and/or can be configurable by an administrator. In some embodiments, the first data structure can based on a type of the data, the destination of the data, a format of the data, a length of the data, content of the data, a checksum of the data, a source port of the data, a destination port of the data, whether the data was prompted, time of the data transmission/receipt, year of the data transmission/receipt, whether or not an app is associated with the data, which apps are or are not associated with the data, the structure of the network, or any combination thereof.

At step 540, the first device/server can add the data in the first data structure into a queue that can be shared with a second device/server (e.g., a second device within the MLP Network, or a server of a second network).

At step 550, the second device/server can read the data in the form of the first data structure from the queue. At step 560, the second device/server can determine a second set of one or more actions to be performed on the read data, e.g., based on the read data. In some embodiments, this can include, for example, antivirus scanning, determining type of communication, limiting an e-mail attachment to some size, etc. In some embodiments, determining the second set of one or more actions to be performed can include passing the read data to one or more applications on the second device/server.

At step 570, the second device/server can convert the read data into a second data structure and/or format. In some embodiments, the conversion can include decrypting the read data, removing a portion of the read data used by the first server of the first computer network, or any combination thereof, and in which the second format can be a format compatible with a next destination for all or a portion of the read data. In some embodiments, the second data structure can based on a type of the data, the destination of the data, a format of the data, a length of the data, source port of the data, a destination port of the data, whether the data was prompted, time of the data transmission/receipt, year of the data transmission/receipt, whether or not an app is associated with the data, which apps are or are not associated with the data, the structure of the network, or any combination thereof.

At step 580, the second device/server can transmit the converted data to the next destination. In some embodiments, the converted data can be transmitted in accordance with a defined protocol, e.g., the MLP protocol. In some embodiments, transmitting via the protocol can include appending information regarding the device and software that transmitted the data to the device/server.

In some embodiments, when software or a file request tries to gain access to the network or the Internet, the packets which can include the request and/or data are intercepted by the MLP Client 145 resident on the MLP Device 140. The MLP Client 145 can check, according to its set rules, if the transaction is permitted. If not, the MLP client can stop the transaction and takes action according to a set of rules. Failure to comply can result in disconnecting the device from the network. In some embodiments, if the MLP Client 145 allows the communication, the MLP Client 145 modifies the packets into the MLP Protocol and encrypts the information if the configuration so dictates.

In some embodiments, if a packet's destination is outside the MLP Network, the packets will go through the MLP Security Center 110. The MLP Security Center inner MLP shell 120 can convert the network packets to a record and submit the record into the outgoing queue 130. The outer MLP shell 125 can then read the record, decrypt the data if needed, convert the record into a network protocol and send the packets to its destination. In some embodiments, if a packet is not allowed to exit the network, the MLP Security Center 110 takes action according to a set of rules. For packets trying to enter the network from an external source such as the Internet, in some embodiments, the MLP Security Center 110 can check if it is a legitimate response to requests from the internal network. Any packet that is destined to a device inside the MLP Network arrives first at the outer MLP shell 125 of the MLP Security Center 110. If the packets are allowed (e.g., after being verified for consistency against the security rules), the outer MLP Shell 125 encrypts the data, if so configured, converts the packets into a record and submits the record into the incoming queue, or send it to an MLP App which runs on the external shell 125. The inner MLP Shell 120 can then read the record (e.g., after being verified for consistency against the security rules), convert the record into an MLP Protocol and transmit the packets into the MLP Device 140. The MLP Client 145 can then decrypt the incoming packets, if encrypted, check the packets and convert them to a network protocol to be forwarded to the appropriate software, e.g., only after being verified for consistency against the security rules. If the packets are not allowed, the MLP Client 145 can log the event, and act according to the specified rules.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for providing security to a first computer network in communication with a second computer network, the method comprising:
   receiving, by a first server of the first computer network, data having a destination of the second computer network, the data in a first format that is a) specific to the second computer network, b) specific to the first computer network, c) specific to another computing network, d) encrypted, or e) any combination thereof;
   determining, by the first server, a first set of one or more actions to be taken based at least in part on the data, wherein the first set of one or more actions comprises transmitting the data to one or more applications on the first server;
   converting, by the first server of the first computer network, the data having the destination network into a first data structure;
   adding, by the first server of the first computer network, the data in the first data structure into a queue, the queue shared with a second server of the first computer network;
   reading, by the second server of the first computer network, the data in the form of the first data structure from the queue;
   determining, by the second server of the first computer network, a second set of one or more actions to be performed based at least in part on the read data;
   converting, by the second server of the first computer network, the read data into a second data structure, wherein the second data structure is a data structure compatible with the destination for all or a portion of the read data; and
   transmitting, by the second server of the first computer network, the converted data to the destination;
   wherein if the received data is from the second computer network and is toward a member of the first computer network, then the data is transmitted via a format that is specialized for the first computer network.

2. The method of claim 1 wherein the first data structure is based on a set of one or more security rules.

3. The method of claim 1 wherein the first set of one or more actions is based on a set of one or more security rules.

4. The method of claim 3 wherein the set of one or more security rules is at least one of predefined, dynamic, and configurable by an administrator.

5. The method of claim 1 wherein at least one of the first set of one or more actions and the second set of one or more actions comprises transmitting, rejecting, denying, dropping, modifying, forwarding, rerouting, logging, passing to an application, or any combination thereof.

6. The method of claim 1 wherein at least one of the first determining step and the second determining step is made based on the content of the data.

7. The method of claim 1 wherein at least one of the first data structure and the second data structure are based on at least one of a type of the data, the destination of the data, a format of the data, a length of the data, content of the data, a checksum of the data, a source port of the data, a destination port of the data, whether the data was prompted, time of the data transmission/receipt, year of the data transmission/receipt, whether or not an app is associated with the data, which apps are or are not associated with the data, the structure of the network.

8. The method as in claim 1, wherein determining the first set of one or more actions to be performed further comprises passing the received data to one or more applications on the first server.

9. The method of claim 1 wherein determining the second set of one or more actions to be performed further comprises passing the read data to one or more applications on the second server.

10. The method of claim 1, wherein transmitting is implemented via a protocol, the protocol comprising appending information regarding the device and software that transmitted the data.

11. The method of claim 1, wherein the data is received by a software client resident on the first server.

12. The method of claim 1, wherein the converting by the first server comprises encrypting the data, adding addition data to the receive data, or any combination thereof.

13. The method of claim 1, wherein the converting by the second server comprises decrypting the read data, removing a portion of the read data used by the first server of the first computer network, or any combination thereof.

14. A method for providing security to a first computer network in communication with a second computer network, the method comprising:
   receiving, by a first computer device of the first computer network, a request for data;
   determining, by the first computer device of the first computer network, whether the request for data is from a second computer network or from within the first computer network;
   determining, by the first computer device of the first computer network, one or more actions to take based on one or more security rules, the data itself, or any combination thereof; and
   performing, by the first computer device, one or more actions, wherein
   if the request for data is from the second computer network, then determining, by a client of the first computer network, whether the request for data is a legitimate request based on the one or more security rules;
   if the request for data is a legitimate request, then transmitting, by the client of the first computer network, the request for data via a protocol that is specific to the first computer network to a server of the first computer network;
      wherein, if the request is from the second computer network and is toward a member of the first computer network, then the data is transmitted via a format that is specialized for the first computer network; and
   if the request for data is not legitimate, denying the request.

15. The method of claim 14 further comprising if the request for data is from an entity within the first computer network and requires data be sent to the second computer network, then transmitting, by the first computer device, the data to the second computer network via an internet protocol.

16. A system for providing security to a first computer network in communication with a second computer network, comprising:
   a server having a processor, and memory; and
   one or more code sets stored in the memory and executing in the processor, which, when executed, configure the processor to:
   receive, by a first server of the first computer network, data having a destination of the second computer network, the data in a first format that is a) specific to the second computer network, b) specific to the first computer network, c) specific to another computing network, d) encrypted, or e) any combination thereof;
   determine, by the first server, a first set of one or more actions to be taken based at least in part on the data, wherein the first set of one or more actions comprises transmitting the data to one or more applications on the first server;
   convert, by the first server of the first computer network, the data having the destination into a first data structure;
   add, by the first server of the first computer network, the data in the first data structure into a queue, the queue shared with a second server of the first computer network;
   read, by the second server of the first computer network, the data in the form of the first data structure from the queue;
   determine, by the second server of the first computer network, a second set of one or more actions to be performed based at least in part on the read data;
   convert, by the second server of the first computer network, the read data into a second data structure, wherein the second data structure is a data structure compatible with the destination for all or a portion of the read data; and
   transmit, by the second server of the first computer network, the converted data to the next destination;
      wherein if the received data is from the second computer network and is toward a member of the first computer network, then the data is transmitted via a format that is specialized for the first computer network.

17. The system of claim 16, wherein the first data structure is based on a set of security rules.

18. The system of claim 16, wherein the first set of one or more actions is based on a set of one or more security rules.

19. The system of claim 18, wherein the set of one or more security rules is at least one of predefined, dynamic, and configurable by an administrator.

20. The system of claim 16, wherein at least one of the first set of one or more actions and the second set of one or more actions comprises transmitting, rejecting, denying, dropping, modifying, forwarding, rerouting, logging, passing to an application, or any combination thereof.

21. The system of claim 16, wherein at least one of the first determining step and the second determining step is made based on the content of the data.

22. The system of claim 16, wherein at least one of the first data structure and the second data structure are based on at least one of a type of the data, the destination of the data, a format of the data, a length of the data, content of the data, a checksum of the data, a source port of the data, a destination port of the data, whether the data was prompted, time of the data transmission/receipt, year of the data transmission/receipt, whether or not an app is associated with the data, which apps are or are not associated with the data, the structure of the network.

23. The system of claim 16, wherein determining the first set of one or more actions to be performed further comprises passing the received data to one or more applications on the first server.

24. The system of claim 16, wherein determining the second set of one or more actions to be performed further comprises passing the read data to one or more applications on the second server.

25. The system of claim 16, wherein transmitting is implemented via a protocol, the protocol comprising appending information regarding the device and software that transmitted the data.

26. The system of claim 16, wherein the data is received by a software client resident on the first server.

27. The system of claim 16, wherein the converting by the first server comprises encrypting the data, adding addition data to the receive data, or any combination thereof.

28. The system of claim 16, wherein the converting by the second server comprises decrypting the read data, removing a portion of the read data used by the first server of the first computer network, or any combination thereof.

29. A system for providing security to a first computer network in communication with a second computer network, comprising:

a server having a processor, and memory; and one or more code sets stored in the memory and executing in the processor, which, when executed, configure the processor to:

receive, by a first computer device of the first computer network, a request for data;

determine, by the first computer device of the first computer network, whether the request for data is from a second computer network or from within the first computer network;

determine, by the first computer device of the first computer network, one or more actions to take based on one or more security rules, the data itself, or any combination thereof; and perform, by the first computer device, one or more actions, wherein if the request for data is from the second computer network, then determining, by a client of the first computer network, whether the request for data is a legitimate request based on the one or more security rules;

if the request for data is a legitimate request, then transmitting, by the client of the first computer network, the request for data via a protocol that is specific to the first computer network to a server of the first computer network;

wherein if the received data is from the second computer network and is toward a member of the first computer network, then the data is transmitted via a format that is specialized for the first computer network; and if the request for data is not legitimate, denying the request.

30. The system of claim 29, further comprising if the request for data is from an entity within the first computer network and requires data be sent to the second computer network, then transmitting, by the first computer device, the data to the second computer network via an internet protocol.

\* \* \* \* \*